United States Patent
Alanis et al.

(10) Patent No.: US 10,011,221 B2
(45) Date of Patent: Jul. 3, 2018

(54) LIGHTED VISOR MIRROR WITH A REMOVABLE LIGHTING MODULE

(71) Applicant: Ford Global Technologies, LLC, Dearborn, MI (US)

(72) Inventors: Guillermo Alanis, Estado de Mexico (MX); Ramiro Chable Hernandez, Cuautitian Izcalli (MX); David Huelke, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 551 days.

(21) Appl. No.: 14/513,779

(22) Filed: Oct. 14, 2014

(65) Prior Publication Data
US 2016/0101724 A1 Apr. 14, 2016

(51) Int. Cl.
*B60Q 1/00* (2006.01)
*B60Q 3/252* (2017.01)
*B60J 3/02* (2006.01)
*B60Q 3/59* (2017.01)

(52) U.S. Cl.
CPC ............ *B60Q 3/252* (2017.02); *B60J 3/0282* (2013.01); *B60Q 3/59* (2017.02)

(58) Field of Classification Search
CPC ...... B60Q 3/00; B60Q 3/0226; B60Q 3/0269; B60Q 3/252; B60J 3/0282
USPC ................ 362/543, 492, 183, 398
See application file for complete search history.

(56) References Cited

U.S. PATENT DOCUMENTS

| | | | |
|---|---|---|---|
| 4,734,831 A | 3/1988 | Keyser et al. | |
| 4,866,579 A | 9/1989 | Miller et al. | |
| 4,984,137 A | 1/1991 | Maemura | |
| 5,077,643 A * | 12/1991 | Leach ............... | B60Q 1/323 362/155 |
| 6,022,131 A * | 2/2000 | Morimoto ............ | B60Q 3/0269 315/84 |
| 6,398,394 B1 * | 6/2002 | Winnik ................ | B60Q 3/007 362/183 |
| 6,742,917 B2 | 6/2004 | Okano et al. | |
| 2007/0014121 A1 * | 1/2007 | Yepes Gomez ........ | B60Q 3/001 362/486 |
| 2007/0133219 A1 * | 6/2007 | Chaloult ................ | B60Q 3/007 362/490 |
| 2007/0159816 A1 * | 7/2007 | Bayat ..................... | F21L 4/027 362/184 |
| 2008/0130305 A1 * | 6/2008 | Wang ................... | B60Q 3/0226 362/492 |
| 2010/0254122 A1 * | 10/2010 | Bayat ..................... | F21L 4/027 362/187 |

* cited by examiner

*Primary Examiner* — Diane Lee
*Assistant Examiner* — Naomi M Wolford
(74) *Attorney, Agent, or Firm* — Vichit Chea; Brooks Kushman P.C.

(57) ABSTRACT

A visor assembly including a visor, a mirror attached to the visor a diffused light source, and a directional light source. The diffused light source and directional light sources are disposed in a modular housing that is removable from the mirror assembly. The diffused light source is powered by the vehicle electrical system. The directional light source is independently operable and powered by a separate rechargeable battery.

9 Claims, 2 Drawing Sheets

LIGHTED VISOR MIRROR WITH A REMOVABLE LIGHTING MODULE

TECHNICAL FIELD

This disclosure relates to vehicle sun visors that include a vanity mirror assembly.

BACKGROUND

Vehicles may include visors that include a lighted mirror, or vanity mirror assembly, for use by vehicle occupants in the front seat of the vehicle. Vehicles are also equipped with a variety of interior lights for illuminating limited portion of a vehicle interior such as the front seat, instrument panel, door sills, consoles, and the like. However, when it is dark and an object is dropped in the vehicle, in many cases it is difficult to find the object using existing interior lights. There is a need for a portable light source that is readily available and fully charged that can be moved to direct light in a desired location when changing a flat tire, checking the oil level or performing other tasks.

This disclosure is directed to solving the above problems and other problems as summarized below.

SUMMARY

According to one aspect of this disclosure, a visor assembly is disclosed for a vehicle that includes a visor, a mirror attached to the visor, a diffused light source and a directional light source. The diffused light source is assembled to the visor for illuminating objects in front of the mirror. The directional light source is assembled to the visor and is removable and independently operable to provide directed light in areas remote from the visor.

According to other aspects of this disclosure, the diffused light source and the directed light source may be both assembled into a housing as a module that is removable from the visor. The diffused light source may be powered by a battery that provides power to the vehicle. The directional light source may be powered by a rechargeable battery that is recharged by the vehicle when the directional light source is attached to the visor. The directional light source is disposed in a housing includes a planar face that is oriented to be generally co-planar with the mirror. The housing has a plurality of side walls that extend towards the visor when the housing is stored in the visor. The diffused light source illuminates the planar face and the directional light projects light from one of the side walls.

According to another aspect of this disclosure, a vanity mirror assembly is provided for a vehicle that comprises a mirror, and a housing for two light sources. The housing is attached to the vehicle adjacent the mirror. A first light source is disposed in the housing for illuminating an area in front of the mirror. A second light source is disposed in the housing for providing illumination in remote locations when the housing is not attached to the vehicle.

According to other aspects of this disclosure as it relates to a vanity mirror assembly, the second light source may be independently operable when the housing is removed from the vehicle. The first light source may be powered by a battery that provides power to the vehicle. The second light source may be powered by a rechargeable battery that is recharged by the vehicle when the housing is attached to the vehicle. The housing may include a planar face that is substantially co-planar with the mirror. A plurality of side walls of the housing extend behind the planar face. The first light source illuminating the planar face and the second light source projects light from one of the side walls.

Other aspects of this disclosure relates to a vanity mirror for a visor of a vehicle. The vanity mirror comprises a mirror attached to the visor and a modular housing detachably attached to the visor. A light source is disposed in the modular housing for illuminating an area in front of the mirror when disposed in the modular housing and illuminating remote locations when the modular housing is not attached to the visor.

The light source is independently operable when the modular housing is removed from the visor. The light source is powered by a battery that provides power to the vehicle and is powered by a rechargeable battery when the housing is detached from the visor. The rechargeable battery is recharged by the vehicle when the modular housing is attached to the visor. The vanity mirror defines a receptacle that is adapted to receive the modular housing, wherein the light source illuminates a planar face of the modular housing, and wherein a plurality of side walls extending behind the planar face and are at least partially received in the receptacle.

The above aspects of this disclosure and other aspects are described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
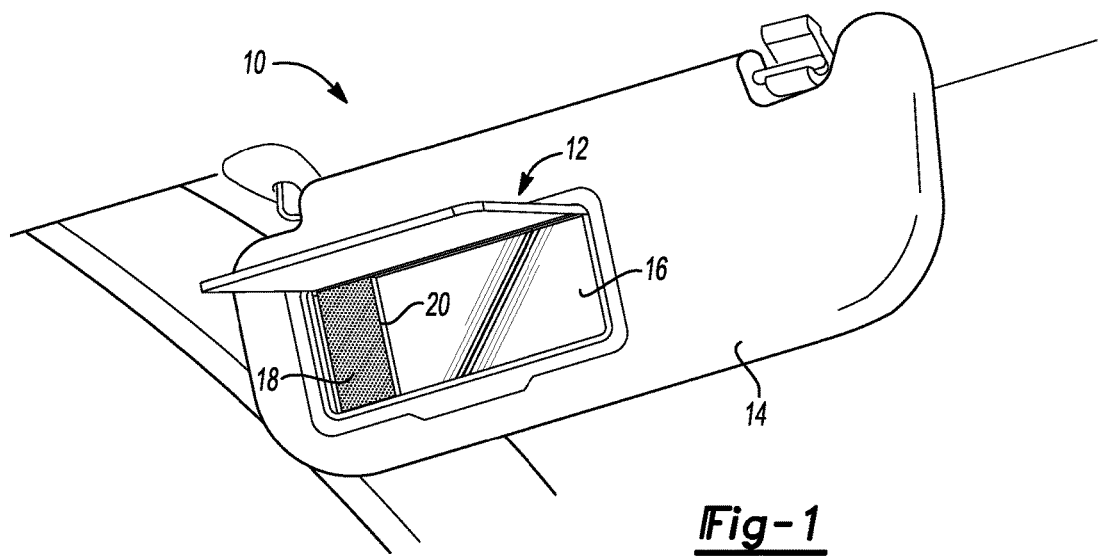
FIG. 1 is a perspective view of a visor assembly made according to one embodiment of this disclosure.

Referring to FIG. 1, a visor assembly 10 is shown that is equipped with a vanity mirror assembly 12. The visor assembly 10 includes a visor 14 that is pivotally attached to the windshield header of a vehicle (not shown). The vanity mirror assembly 12 includes a mirror 16 and a diffused light source 18. The diffused light source 18 is generally coplanar with the mirror 16 to illuminate objects, such as a person's face in front of the mirror to facilitate combing one's hair, applying make-up, or the like. The diffused light source 18 is housed in a lighting module 20.

Figure 2:
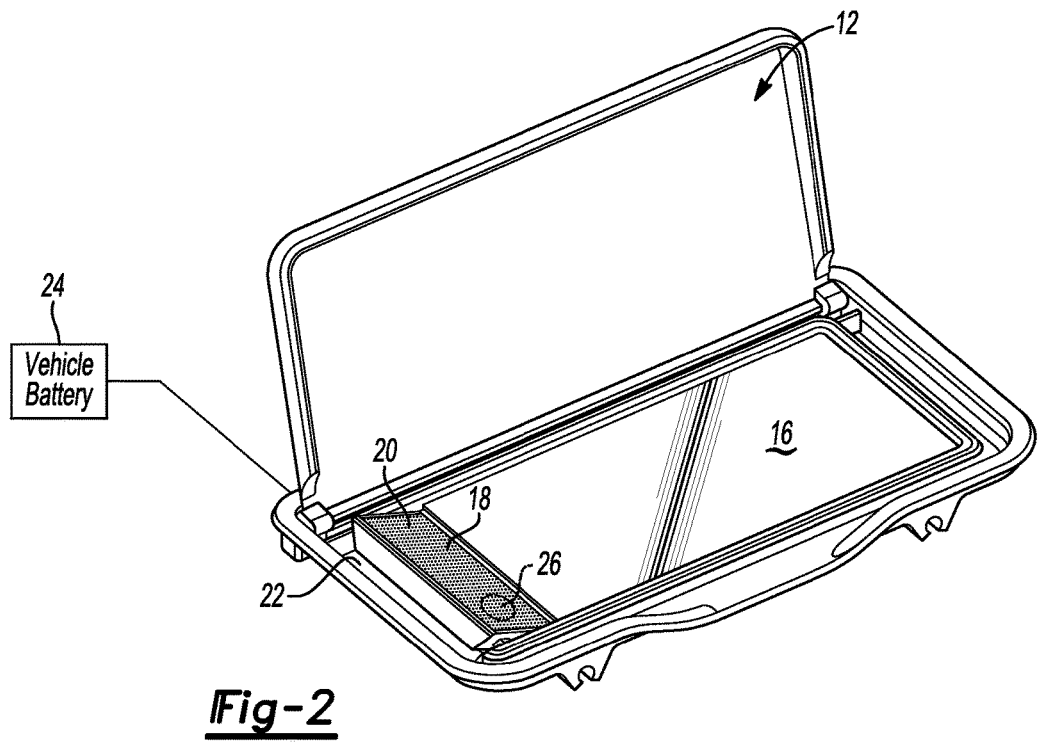
FIG. 2 is a perspective view of a vanity mirror assembly detached from the visor shown in FIG. 1 with a light module partially removed.

Referring to FIG. 2, the vanity mirror assembly 12 is shown in isolation separated from the visor 14 (shown in FIG. 1). The vanity mirror assembly 12 includes a mirror 16 and a lighting module 20. The lighting module 20 houses or supports the diffused light source 18 that illuminates an area in front of the mirror 16. The lighting module 20 is received in a receptacle 22. The diffused light source 18 is connected to the vehicle battery 24 that provides power to the diffused light source 18. The lighting module 20 also houses a rechargeable battery 26 that provides power when the lighting module 20 is removed from the receptacle 22.

Figure 3:
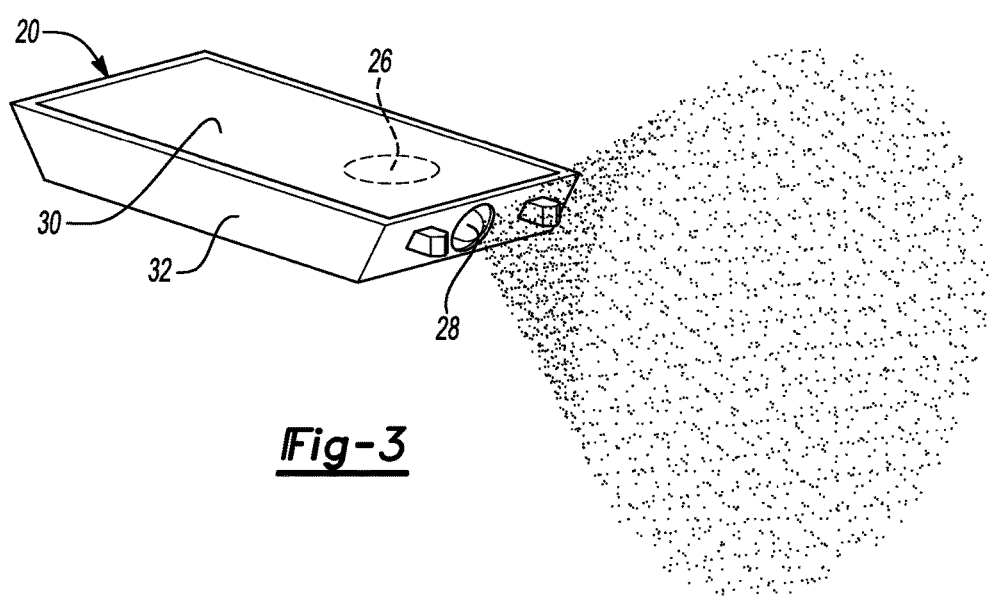
FIG. 3 is a perspective view of a light module removed from the vanity mirror assembly.

Referring to FIG. 3, the lighting module 20 is shown removed from the vanity mirror assembly 12 (shown in FIG. 2). The lighting module 20 is powered by the rechargeable battery 26 that is recharged when the lighting module 20 is lodged in the receptacle 22. Power for charging the rechargeable battery 26 is provided by the vehicle battery 24 or otherwise by the vehicle electrical system.

The lighting module 20 includes a directional light source 28 that may be an LED light or incandescent light that is provided with a reflector or lens that functions to direct light from the directional light source 28 to illuminate a remote object. A face 30 is provided on the lighting module 20. The diffused light source 18 illuminates the face 30 and may include a lens or a translucent light transmitting member.

A plurality of side walls 32 extend behind the face 30. The side walls 32 are received within the receptacle 22 (shown in FIG. 2) when the lighting module 20 is disposed in the receptacle. The directional light source 28 is preferably provided in one of the side walls 32 of the lighting module 20.

When the lighting module 20 is removed from the receptacle 22, the directional light source 28 may be used to direct light towards an item dropped on the floor of a vehicle or within the interior of the vehicle. The directional light source 28 is independently operable and may be used to facilitate changing a tire, checking fluid levels, or for any other purpose where a flashlight may be useful.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vanity mirror assembly for a vehicle comprising:
    a mirror;
    a modular housing attached to the vehicle adjacent the mirror;
    a first light source disposed in the modular housing for illuminating an area in front of the mirror; and
    a second light source disposed in the modular housing for providing illumination in remote locations when the modular housing is not attached to the vehicle.

2. The vanity mirror assembly of claim 1 wherein the second light source is independently operable when the modular housing is removed from the vehicle.

3. The vanity mirror assembly of claim 1 wherein the first light source is powered by a battery that provides power to the vehicle.

4. The vanity mirror assembly of claim 1 wherein the second light source is powered by a rechargeable battery that is recharged by the vehicle when the modular housing is attached to the vehicle.

5. The vanity mirror assembly of claim 1 wherein the modular housing includes a planar face that is co-planar with the mirror and a plurality of side walls extending behind the planar face, wherein the first light source illuminates the planar face and the second light source projects light from one of the side walls.

6. A visor assembly comprising:
    a visor including a mirror and an adjacent receptacle;
    a detachable light housing including a face and a sidewall and receivable in the receptacle with the sidewall in the receptacle and the face coplanar with the mirror;
    a diffused light in the housing and arranged to project light through the face; and
    a directional light in the housing and arranged to project light through the sidewall when the housing is detached.

7. The vanity mirror of claim 6 wherein the diffused and directional lights are independently operable when the housing is removed from the visor.

8. The vanity mirror of claim 6 wherein the diffused light is powered by a battery that provides power to the vehicle.

9. The vanity mirror of claim 6 wherein the directional light is powered by a rechargeable battery that is recharged by the vehicle when the housing is received in the receptacle.

* * * * *